April 3, 1928.
A. J. BREEDEN
1,664,659
CATCHER ATTACHMENT FOR LAWN SWEEPERS AND THE LIKE
Filed May 17, 1927
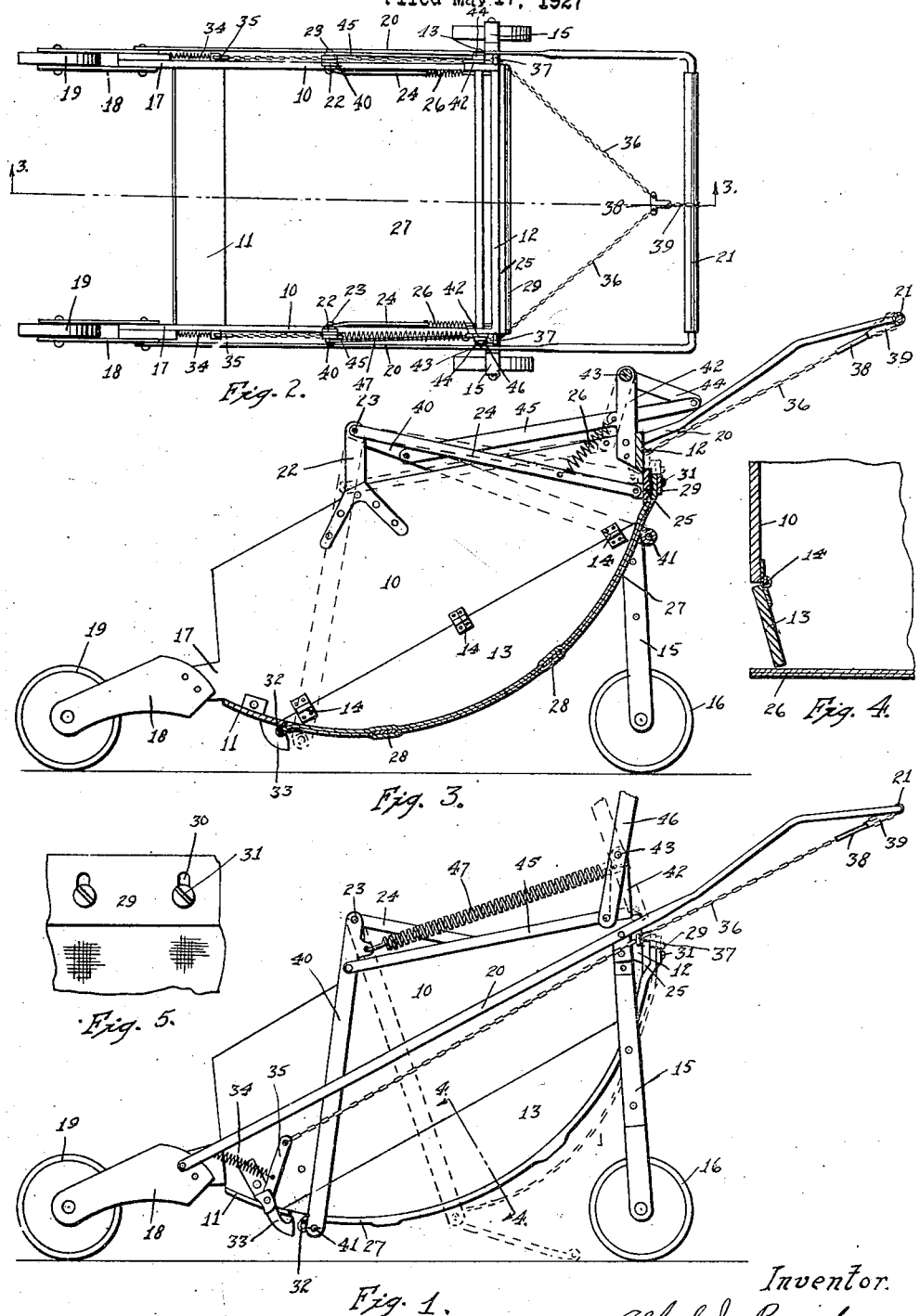
Inventor.
Alfred J. Breeden
by Onins & Hague Attorneys.

Patented Apr. 3, 1928.

1,664,659

UNITED STATES PATENT OFFICE.

ALFRED J. BREEDEN, OF GRINNELL, IOWA.

CATCHER ATTACHMENT FOR LAWN SWEEPERS AND THE LIKE.

Application filed May 17, 1927. Serial No. 192,009.

The object of my invention is to provide an attachment for lawn sweepers and mowers and the like, adapted to catch the sweepings or cuttings and to convey them to a convenient point and discharge the same, and having dumping means whereby light and loose material may be positively dumped and disposed on the ground surface while the device is being advanced over the ground surface.

More specifically it is the object of my invention to provide in connection therewith improved dumping means of simple, durable and inexpensive construction, and which is positive in its action.

A further object is to provide in a catcher attachment of that type employing a flexible bottom adapted to have one end swing rearwardly at the time the dumping takes place, improved means for maintaining a constant tension on the bottom member to cause it to fit snugly with the side members of the catcher, to prevent leakage.

A further object is to provide an improved operating mechanism for the flexible bottom.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved device.

Figure 2 is a plan view of the same.

Figure 3 is a longitudinal sectional view of the same taken on the line 3—3 of Fig. 2.

Figure 4 is an enlarged, detail, sectional view taken on the line 4—4 of Figure 1.

Figure 5 is an enlarged detail view of a portion of the member for supporting the flexible bottom.

My improved catcher comprises a pair of spaced side members 10 having their forward ends connected by a plate 11 and their rear ends connected with a back member 12. The bottom edges of the members 10 are inclined upwardly and rearwardly, the said inclined edges each being provided with a hinged segmental member 13. The lower edge of the member 13 is formed circular. The hinged edges of the members 10 and 13 are connected by hinges 14.

The back ends of the members 10 are provided with downwardly extending legs 15, each of which is provided with a wheel 16. The forward ends of the members 10 are each provided with a forwardly extending portion 17. The members 17 may be connected directly to the frame of the lawn mower or sweeper, or they may be provided with arms 18, each of which has a wheel 19. When the wheels 19 are provided, the catcher may be operated independently of the sweeper or mower to convey the material to a dumping location.

Secured adjacent to each outer side of the members 10 is a handle bar 20, the back ends of the handle bars being connected by a cross bar 21, which serves as a handle for operating the catcher.

Supported on the upper edge of each of the members 10 is a bracket 22, each of said brackets being provided with a pivot member 23, said pivot members being located in the center of the circle inscribing the lower edges of the members 13. Pivotally connected to the inner face of each of the members 22 and upon the pivot member 23 is a rearwardly extending bar 24. The rear ends of the bars 24 are designed to support a bar 25 adapted to be elevated and lowered adjacent to the rear ends of the members 10 and to move upwardly opposite the back of the bar 12. Springs 26 are provided for yieldably supporting the said bar 25 in its elevated position.

Adjustably secured to the back face of the bar 25 is an apron 27, preferably formed of several thicknesses of fabric, which are quilted together. A series of stiffening ribs 28 is provided between the layers of fabric. The member 27 provides a bottom for the catcher. The upper edge of the member 27 is secured to a plate 29 having slots 30 for receiving set screws 31, said set screws being secured in the plate 25. This provides means for adjustably securing the upper edge of the member 27 to the bar 25. The width of the member 27 is such that its outer edges will engage the curved edge of the members 13 with its free edge in engagement with the rear edge of the plate 11. The free edge of the member 27 is provided with a rod 32 having ends projecting beyond the side members 13. Each of the members 10 is provided with a pivoted hook 33 designed to receive the projecting ends of the rod 32 when the member 27 is stretched adjacent to the curved edges of the members 13. A spring 34 is provided for retaining the hooks 33 in a closed position. Each of the hooks has an upwardly extending arm 35. A chain 36 is connected to each of the members 35 and extends upwardly and rearwardly and passes through eyelets 37, the free end of each chain being connected to a link 38, which in turn is connected to the handle 21 by a short chain 39. The chains 36 provide means for releasing the hooks 33 from the rod 32, after which the forward end of the member 27 will fall upon the ground surface and be rolled backwardly as the device is advanced, in such a manner that the material within the catcher will be delivered to the ground surface, which will pass beneath the member 27.

For returning the apron 27, I have pivotally connected to the outer face of each of the brackets 22, and upon the pivot members 23, rearwardly extending arms 40, having their free ends connected with a roller 41. Supported to the rear end of each of the members 10 is an upwardly projecting arm 42, in which is rotatively mounted a rock shaft 43, having downwardly and rearwardly extending arms 44. A link 45 is pivotally connected to each of the arms 44 and also to the arms 40. The shaft 43 is also provided with an upwardly extending lever 46, which provides means whereby the shaft 43 will be rocked. The roller 41 normally rests in the position illustrated in Figure 3. It will be seen that if the upper end of the lever 46 is moved rearwardly, the roller 41 will be moved forwardly causing the rearwardly extending portion of the apron 27 to be gathered, and placed adjacent to the circular edge of the members 13, until the outer ends of the shafts 32 engage the forward edge of the lower ends of the members 40, said engagement taking place at a time slightly before the rod 32 enters the hooks 33, at which time the apron 27 is drawn taut. Further movement of the arms 40 will force the rod 32 into the hooks 33, causing the apron to be moved longitudinally and the bar 25 to be lowered against the pressure of the springs 26. The said springs 26 support the apron in a taut condition against the curved edges of the members 13, after which the roller 41 may be returned to its normal position of movement by means of suitable springs 47, said springs being connected to the arms 40 and the arms 44.

In this connection it should be noted that the action of the springs 26 and the bar 25 are very important. I have found by actual experience that it is almost impossible to throw the rod 32 into the hooks 33 if the yieldable bar 25 is omitted. If the yieldable bar 25 is omitted, then the apron 27 would have to be slightly longer than illustrated, so that the rod 32 will just enter the hooks 33 when the apron is drawn taut. I find in actual practice that instead of the rod entering between the upper edge of the hooks 33 and the lower edge of the members 13, it would be thrown to position beneath the lower edge of the hooks 33, and the rod would thereby fail to enter the hooks. This is due to the fact that the free end of the apron is always extending rearwardly as illustrated by dotted lines in Figure 1, as the lower end of the bars 40 are being advanced. The momentum or centrifugal force of the bar, as it leaves the ground surfaces, causes the bar to be thrown to the under side of the hook member 33. By providing the yieldable bar 25, it will be seen that the rod 32 is caused to snugly fit against the forward edge of the members 40 and to be thrown into position in alinement with the hooks before it reaches the free ends of the hooks.

Another important feature of my device lies in the pivoted side members 13, which are so arranged that when the apron 27 is moved to its closed position, the said side members 13 will be inclined inwardly in the manner illustrated in Figure 4, due to the upward tension on the apron. If the load within the catcher somewhat stretches the apron, then it will be seen that the side members will automatically assume a position near the vertical, causing a tight fit to always be maintained between the lower edges of the members 13 and the apron, even if the said apron is stretched considerably. The ribs 28 provide stiffening means to prevent the apron from sagging between its ends. The outer ends of the members 28 are designed to rest against the lower edges of the members 13. The set screws 31 provide means whereby any excessive stretching of the apron may be readjusted to maintain the side members 13 normally in a proper inclined position.

This catcher is particularly adapted for collecting loose material, such as leaves.

I claim as my invention:

1. A catcher comprising a container having parallel side members, a back member and a front member to form an open bottom, the lower edges of the side members being provided with pivoted segments to rest normally inclined inwardly, a bottom member comprising a flexible apron having one end secured adjacent to the back and its opposite end secured adjacent to the lower edge of said front member, means for detachably locking the front edge of said apron in the last said position, and means for releasing said locking means.

2. A catcher comprising a container having side members, a back member and a front member and an open bottom, the lower edges of said side members being formed circular, a bar supported yieldably and adjacent to the lower edge of said back member, a flexible apron forming a bottom for said container, having its rear end attached to said yieldable bar, means for detachably mounting the forward edge of said flexible bottom adjacent to the bottom edge of said front member, with the flexible bottom in engagement with the lower edge of said side members, means for releasing the forward edge of said apron to permit it to fall to the ground surface, and means for supporting said container above the ground surface.

3. A catcher comprising a container, having spaced side members, a back member, a front member, and an open bottom, a flexible apron forming a bottom member for said container, means for rigidly supporting the rear edge of said bottom member adjacent to the lower edge of said back member, means for detachably supporting the front edge of said bottom member adjacent to the lower edge of said front member, means for releasing the forward edge of the apron from the last said means, and reinforcing ribs for said flexible bottom member.

4. A catcher comprising a container having spaced side members, a back member and a front member to provide an open bottom, a flexible apron forming a bottom member for said container, means for rigidly supporting the rear edge of said bottom member adjacent to the lower edge of said back member, means for detachably supporting the front edge of said bottom member adjacent to the lower edge of said front member, means for releasing the forward edge of the apron from the last said means, reinforcing ribs for said flexible bottom member, and hand actuated means for returning the flexible bottom member from an open position to a closed position.

5. A catcher comprising a container having side members, a back member and a front member, and provided with an open bottom, means for supporting the bottom of said container above the ground surface, a yieldable bar supported adjacent to the lower edge of said back member, a flexible bottom for said container having one end secured to said yieldable bar, means for adjusting the rear edge of said bottom member relative to said yieldable bar, means for detachably securing the front edge of said flexible bottom member adjacent to the lower edge of said front member, means for releasing the forward edge of said bottom member to permit the forward edge of said bottom member to fall to the ground surface and to be moved rearwardly as the device is advanced, a roller adapted to be moved forwardly adjacent to the lower edge of said side members of the container, and beneath said flexible bottom for returning said flexible bottom to its closed position, hand actuated means for moving said roller forwardly, and yieldable means for returning the roller to its normal position.

6. A catcher comprising a container having side members, a back member, a front member and provided with an open bottom, the lower edge of said side members being formed circular, a bracket mounted on the upper edge of each of said side members having a pivot in the center of the curvature of said side members, a flexible apron to form a bottom for said container, one edge of said apron being supported adjacent to the lower edge of said back member, a bar for supporting the back edge of said apron, a link pivotally connected to each end of said bar, the opposite ends of said links being mounted on the pivot members of said brackets, yieldable means for supporting said bar in its upper position of movement, the forward edge of said apron being provided with a transverse rod having projecting ends, hook devices for receiving said rod and maintaining said apron adjacent to the curved portion of said side members, means for releasing said hooks, a second link pivotally connected to each of said brackets, a roller connecting the free ends of said second links adapted to engage the under surface of said apron and to move it from an open position to a closed position, a rock shaft having downwardly extending arms, and links for connecting said arms with the last said pivoted bars.

Des Moines, Iowa, April 28, 1927.

ALFRED J. BREEDEN.